United States Patent
Iwasaki et al.

(10) Patent No.: US 9,452,642 B2
(45) Date of Patent: Sep. 27, 2016

(54) PNEUMATIC TIRE

(71) Applicant: Sumitomo Rubber Industries, Ltd., Kobe-shi, Hyogo (JP)

(72) Inventors: Satoshi Iwasaki, Kobe (JP); Yosuke Matsuda, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 404 days.

(21) Appl. No.: 14/045,996

(22) Filed: Oct. 4, 2013

(65) Prior Publication Data
US 2014/0238567 A1 Aug. 28, 2014

(30) Foreign Application Priority Data
Feb. 26, 2013 (JP) .................................. 2013-036136

(51) Int. Cl.
*B60C 11/03* (2006.01)
*B60C 11/04* (2006.01)

(52) U.S. Cl.
CPC .... *B60C 11/0306* (2013.04); *B60C 2011/0346* (2013.04); *B60C 2011/0353* (2013.04); *B60C 2011/0365* (2013.04); *B60C 2011/0381* (2013.04); *B60C 2011/0383* (2013.04); *B60C 2011/0388* (2013.04); *B60C 2011/1209* (2013.04)

(58) Field of Classification Search
CPC .................. B60C 11/0306; B60C 2011/0365; B60C 2011/0381; B60C 2011/0388; B60C 2011/0383; B60C 2011/039; B60C 2011/0341; B60C 2011/0346; B60C 2011/0353; B60C 11/04; B60C 2011/0358
USPC ........... 152/209.18, 900; D12/586, 587, 589, D12/519, 520, 522, 551, 552, 554
See application file for complete search history.

(56) References Cited

U.S. PATENT DOCUMENTS

| D647,034 S | * | 10/2011 | Iwasaki | ........................ D12/586 |
| D647,465 S | * | 10/2011 | Iwasaki | ........................ D12/586 |
| 2004/0020577 A1 | | 2/2004 | Hirai | |
| 2013/0068360 A1 | * | 3/2013 | Tamugi | ............... B60C 11/0306 |
| | | | | 152/209.18 |

FOREIGN PATENT DOCUMENTS

| EP | 2570270 A1 | 3/2013 |
| JP | 2004-58839 A | 2/2004 |
| WO | WO 2014/119567 A1 | 8/2014 |

OTHER PUBLICATIONS

Extended European Search Report dated Dec. 9, 2014, issued in European Application No. 14150346.6.

* cited by examiner

*Primary Examiner* — Eric Hug
(74) *Attorney, Agent, or Firm* — Birch Stewart Kolasch & Birch LLP

(57) ABSTRACT

A pneumatic tire includes a tread portion provided with a pair of shoulder main grooves adjacent to each tread edge and a pair of center main grooves disposed axially inwardly of the shoulder main grooves to define a pair of middle portions each of which is between the adjacent shoulder main groove and center main groove. The center main grooves have groove widths larger than the groove widths of the shoulder main grooves. The respective middle portions are provided with a plurality of inner middle lug grooves extending axially outwardly of the tire from the center main groove, and a plurality of outer middle lug grooves extending axially inwardly of the tire from the shoulder main groove. The total number of inner middle lug grooves is smaller than the total number of outer middle lug grooves in each middle portion.

6 Claims, 7 Drawing Sheets

PNEUMATIC TIRE

BACKGROUND OF THE INVENTION

1. Field of the Invention

The present invention relates to a pneumatic tire, and in particular, relates to a pneumatic tire used for traveling on mud terrain.

2. Description of the Related Art

Pneumatic tires for use on both dry roads and mud terrain are well known as All-season tires, for example. As for such tires, Japanese Unexamined Patent Application Publication No. 2004-58839 discloses a pneumatic tire that includes a tread portion having a circumferentially extending main groove, and a plurality of lateral lug grooves from the main groove with small groove widths. Although the tire configured as above may have a superior noise performance on dry roads due to lug grooves having small groove widths, mud terrain performance of the tire tends to deteriorate due to decreased traction force that is generated from lug grooves with small groove widths.

SUMMARY OF THE INVENTION

The present invention has been worked out in light of the circumstances described above, and has a main object of providing a pneumatic tire having an improved mud terrain performance while maintaining noise performance on dry roads.

According to one aspect of the present invention, there is provided a pneumatic tire including a tread portion having a pair of tread edges, the tread portion being provided with a pair of circumferentially and continuously extending shoulder main grooves adjacent to each tread edge and a pair of circumferentially and continuously extending center main grooves disposed axially inwardly of the shoulder main grooves to define a pair of middle portions each of which is between the adjacent shoulder main groove and center main groove. The shoulder main grooves have groove widths, and the center main grooves have groove widths larger than the groove widths of the shoulder main grooves. The respective middle portions are provided with a plurality of inner middle lug grooves extending axially outwardly of the tire from the center main groove, and a plurality of outer middle lug grooves extending axially inwardly of the tire from the shoulder main groove. The total number of inner middle lug grooves is smaller than the total number of outer middle lug grooves, in each middle portion.

In the first aspect of the present invention, the total number of inner middle lug grooves may be in a range of from 40% to 60% in relation to the total number of outer middle lug grooves in each middle portion.

In the first aspect of the present invention, each middle portion may be provided with two outer middle lug grooves every between adjacent inner middle lug grooves.

In the first aspect of the present invention, groove widths of the inner middle lug grooves are gradually decreasing axially outwardly of the tire from the center main groove, and groove widths of the outer middle lug grooves are gradually decreasing axially inwardly of the tire from the shoulder main groove.

In the first aspect of the present invention, each of the shoulder main grooves and the center main grooves comprises a plurality of axially inner parts and a plurality of axially outer parts disposed axially inwardly of the axially outer parts, and the axially outer parts and the axially inner parts are alternately arranged in a circumferential direction of the tire.

In the first aspect of the present invention, each of the shoulder main grooves and center main grooves may have an axially inner groove edge and an axially outer groove edge, and a first axial gap between the axially inner part and the axially outer part on the axially inner groove edge may be smaller than a second axial gap between the axially inner part and the axially outer part on the axially outer groove edge.

In the first aspect of the present invention, the first axial gap may be in a range of from 60% to 90% in relation to the second axial gap.

In the first aspect of the present invention, each middle portion may be provided with a circumferentially extending longitudinal sub groove that communicates between the adjacent outer middle lug groove and inner middle lug groove, or between the adjacent outer middle lug grooves.

DESCRIPTION OF THE EMBODIMENTS

An embodiment of the present invention will be explained below with reference to the accompanying drawings.

Figure 1:
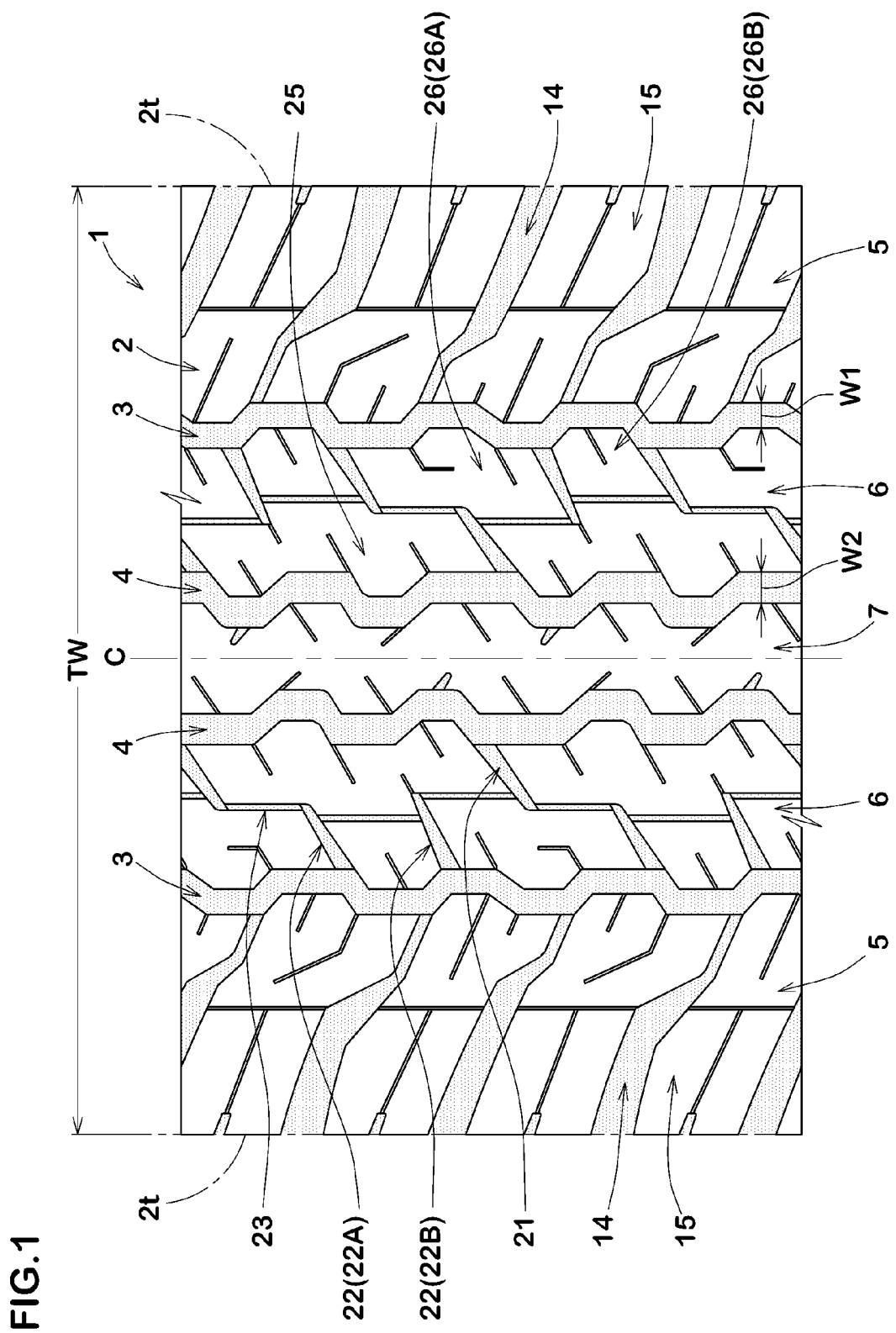
FIG. 1 is a development view of a tread portion of a pneumatic tire according to an embodiment of the present invention.

FIG. 1 illustrates a pneumatic tire 1 in accordance with the present embodiment that may be suitably embodied as a tire for four-wheel drive vehicles that travel on both dry roads and mud terrain.

The tire 1 includes a tread portion 2 having a pair of tread edges 2t, 2t.

Here, tread edges 2t are the axial outermost edges of the ground contacting patch of the tread portion 2 which occurs under a normally inflated loaded condition when the camber angle of the tire is zero. The normally inflated loaded condition is such that the tire is mounted on a standard wheel rim and inflated to a standard pressure and loaded with a standard tire load.

The tread width TW of the tread portion 2 is defined as the width measured under a normally inflated unloaded condition, as the axial distance between the tread edges 2t, 2t determined as above.

The normally inflated unloaded condition is such that the tire is mounted on the standard wheel rim and is inflated to the standard pressure but loaded with no tire load. In this application including specification and claims, various dimensions, positions and the like of the tire refer to those under the normally inflated unloaded condition of the tire unless otherwise noted.

The standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list. The standard pressure is the "maximum air pressure" in JATMA, the "Inflation Pressure" in ETRTO, and the maximum pressure given in the "Tire Load Limits at Various Cold Inflation Pressures" table in TRA or the like. In case of passenger car tires, however, the standard pressure is uniformly defined as 180 kPa.

The standard tire load is the "maximum load capacity" in JATMA, the "Load Capacity" in ETRTO, and the maximum value given in the above-mentioned table in TRA or the like.

The tread portion 2 is provided with a pair of circumferentially and continuously extending shoulder main grooves 3, 3 adjacent to each tread edge 2t, and at least one, preferably a pair of circumferentially and continuously extending center main grooves 4, 4 disposed axially inwardly of the shoulder main grooves 3, 3. Thus, the tread portion 2 is separated into a plurality of land portions that include a pair of shoulder portions 5 each of which is between adjacent shoulder main groove 3 and the tread edge 2t, a pair of middle portions 6 each of which is between adjacent shoulder main groove 3 and center groove 4, and a center portion 7 between center main grooves 4, 4. The tread portion 2 according to the present embodiment is configured to a point symmetrical groove pattern with respect to a point on a tire equator C except for the variable pitches configuration.

Figure 2:
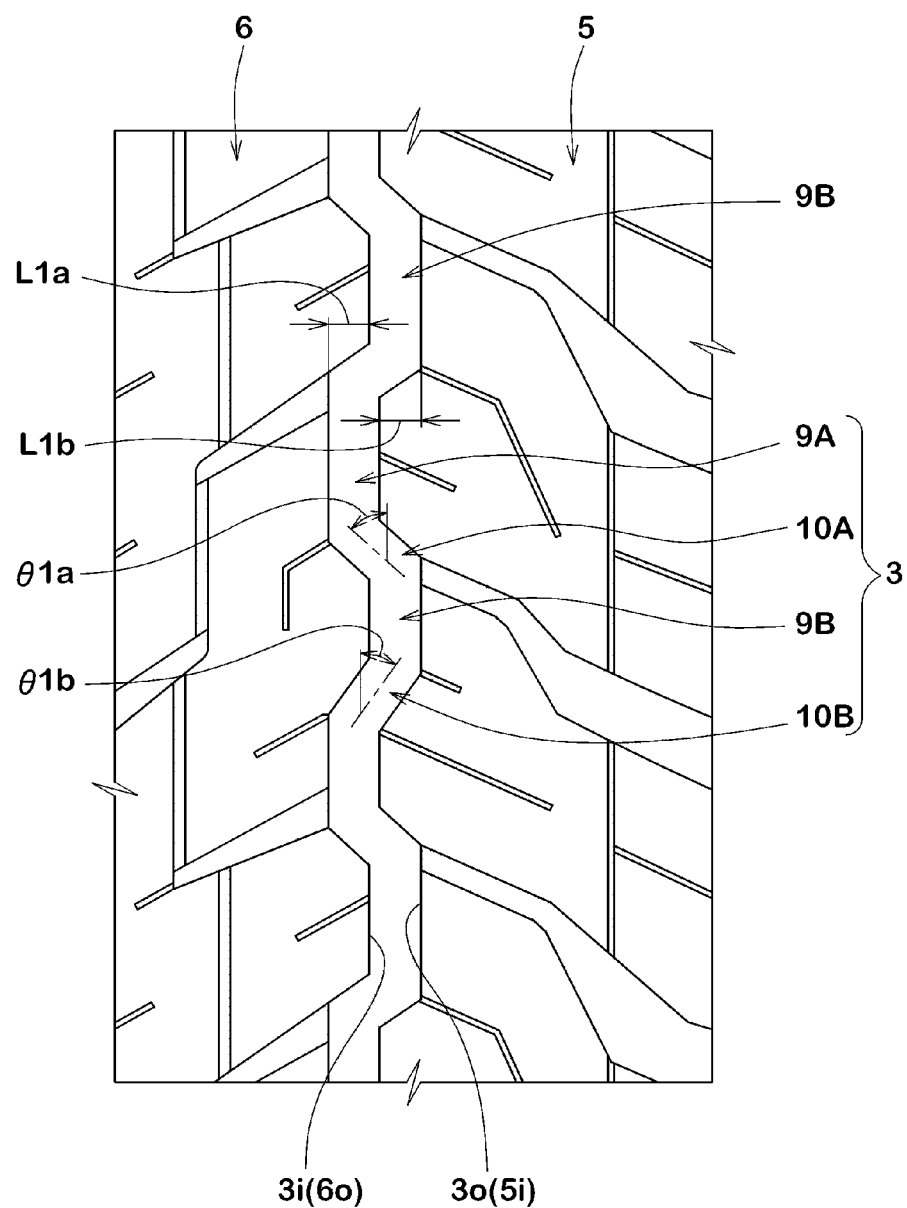
FIG. 2 is a partial enlarged view of a shoulder main groove of FIG. 1.

FIG. 2 illustrates a partial enlarged view of a shoulder main groove 3. Referring to FIG. 2, the shoulder main groove 3 includes its axially inner groove edge 3i that corresponds to the axially outer edge 6i of the middle portion 6, and its axially outer groove edge 3o that corresponds to the axially inner edge 5i of the shoulder portion 5.

The shoulder main groove 3 includes a plurality of circumferentially extending axially inner parts 9A, and a plurality of circumferentially extending axially outer parts 9B disposed axially outwardly of the axially inner parts 9A. The axially inner parts 9A and the axially outer parts 9B are alternately arranged in a circumferential direction of the tire. Furthermore, shoulder main groove 3 includes a plurality of first inclined parts 10A each of which connects between the axially inner part 9A and the axially outer part 9B having a first direction with respect to a circumferential direction of the tire, and a plurality of second inclined parts 10B each of which connects between the axially inner part 9A and the axially outer part 9B having a second direction opposite to the first direction. The first inclined part 10A and the second inclined part 10B are alternately arranged in the circumferential direction of the tire. Thus, the shoulder main groove 3 extends in a trapezoid wave manner.

Since the axially inner and outer parts 9A and 9B straightly extend in the circumferential direction of the tire, the axially inner and outer parts 9A and 9B may allow that mud or water is smoothly released backwardly for better self-cleaning during traveling. Furthermore, since the first inclined parts 10A and the second inclined parts 10B include lateral edge components, the first and second inclined parts 10A and 10B may firmly compress loose mud therein, and shear it off for generating large mud shearing force. Thus, such shoulder main grooves 3 help to optimize drainage performance and mud terrain performance while releasing mud therefrom.

Preferably, the shoulder main grooves 3 have groove widths W1 (shown in FIG. 1) are in a range of from 7.0 to 10.0 mm, and groove depths (not shown) in a range of from 8.0 to 12.0 mm. Furthermore, the first inclined parts 10A and the second inclined parts 10B preferably have angles $\theta 1a$, $\theta 1b$ in a range of from 30 to 50 degrees with respect to the circumferential direction of the tire.

Regarding the shoulder main groove 3, a first axial gap L1a between the axially inner part 9A and the axially outer part 9B on the axially inner groove edge 3i is preferably smaller than a second axial gap L1b between the axially inner part 9A and the axially outer part 9B on the axially outer groove edge 3o. Thus, the degree of the irregularity of the axially outer edge 6o on the middle portion 6 is smaller than the degree of the irregularity of the axially inner edge 5i on the shoulder portion 5. Typically, the larger the degree of irregularity of a circumferential edge of each land portion of the tread portion, the louder the impact noise due to the edge coming into contact with a road during traveling. Furthermore, sound level of the impact noise described above tends to proportionally increase according to the contact pressure on the edge of the tread portion.

In the present embodiment, since the degree of the irregularity of the axially outer edge 6o on the middle portion 6, which is subjected to relatively large contact pressure, is smaller than the degree of the irregularity of the axially inner edge 5i on the shoulder portion 5, tire impact noise may be lowered while maintaining mud terrain performance.

In order to further improve the advantage above, the first axial gap L1a is preferably in a range of from 60% to 90% in relation to the second axial gap L1b. In case that the first axial gap L1a is more than 90% the second axial gap L1b, it may be difficult to effectively decrease the impact noise. In case that the first axial gap L1a is less than 60% the second axial gap L1b, mud terrain performance of the tire may be deteriorate. In view of above, the first axial gap L1a is more preferably in a range of from 65% to 85% in relation to the second axial gap L1b.

Figure 3:
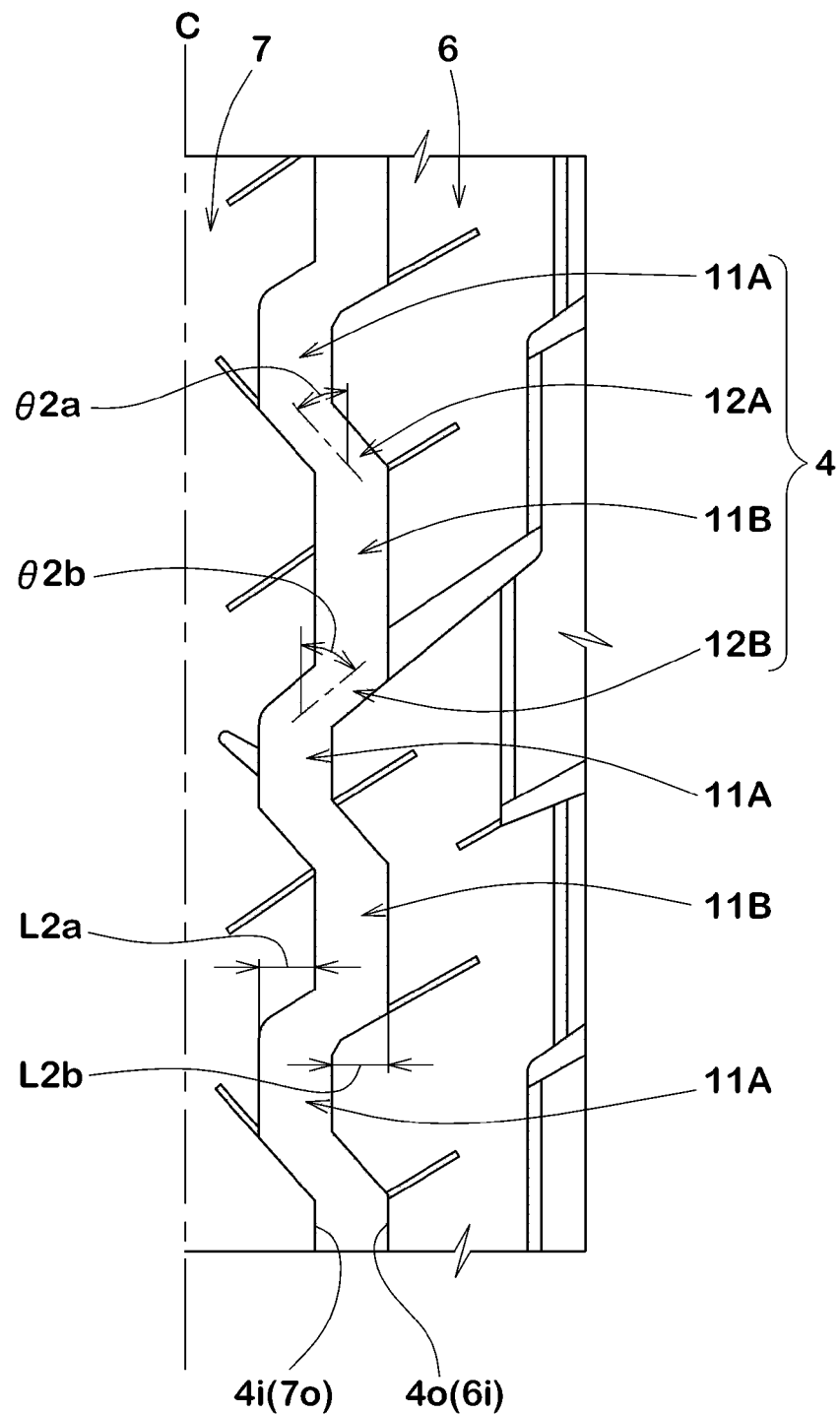
FIG. 3 is a partial enlarged view of a center main groove of FIG. 1.

FIG. 3 illustrates a partial enlarged view of the center main groove 4 of FIG. 1. As shown in FIG. 3, the center main groove 4 includes an axially inner groove edge 4i that corresponds to an axially outer edge 7o of the center portion 7, and an axially outer groove edge 4o that corresponds to an axially inner edge 6i of the middle portion 6.

The center main groove 4 further includes a plurality of circumferentially extending axially inner parts 11A, a plurality of circumferentially extending axially outer parts 11B disposed axially outwardly of the axially inner parts 11A, a plurality of first inclined parts 12A each of which connects between the axially inner part 11A and the axially outer part 11B having a first direction with respect to a circumferential direction of the tire, and a plurality of second inclined parts 12B each of which connects between the axially inner part 11A and the axially outer part 11B having a second direction opposite to the first direction. These parts 11A, 11B, 12A and 12B are arranged so as to extend in a circumferentially trapezoid wave manner, like the shoulder main groove 3. Thus, the center main groove 4 also helps to optimize drainage performance and mud terrain performance while releasing mud therefrom.

The center main groove 4 has a groove width W2 (shown in FIG. 1) and a groove depth, which are preferably in the same range of the groove width W1 (shown in FIG. 1) and the groove depth of the shoulder main grooves 3, respectively. Furthermore, the first inclined parts 12A and the second shoulder inclined parts 12B preferably have angles $\theta 2a$, $\theta 2b$ in a range of from 30 to 50 degrees with respect to the circumferential direction of the tire.

Regarding the center main groove 4, a first axial gap L2a between the axially inner part 11A and the axially outer part 11B on the axially inner groove edge 4i is preferably smaller than a second axial gap L2b between the axially inner part 11A and the axially outer part 11B on the axially outer groove edge 4o. Thus, the degree of the irregularity of the axially outer edge 7o on the center portion 7 is smaller than the degree of the irregularity of the axially inner edge 6i on the middle portion 6. Since the degree of the irregularity of the axially outer edge 7o on the center portion 7, which is subjected to relatively large contact pressure, is smaller than the degree of the irregularity of the axially inner edge 6i on the middle portion 6, tire impact noise may be further lowered while maintaining mud terrain performance.

In order to further improve the advantage above, the first axial gap L2a is preferably in a range of not less than 60%, more preferably not less than 65%, but preferably not more than 90%, more preferably not more than 85% in relation to the second axial gap L2b.

As shown in FIG. 1, the center main grooves 4 in accordance with the present embodiment are configured to have groove widths W2 larger than the groove widths W1 of the shoulder main grooves 3. Thus, the center main grooves 4 may generate the relatively large mud shearing force utilizing high contact pressure thereon as compared to the shoulder main grooves 3. Furthermore, the center main groove 4 may smoothly release backwardly the water on the road during traveling straight ahead.

Accordingly, the tire having the center main grooves 4 and shoulder main grooves 3 in accordance with the present embodiment may improve mud terrain performance and drainage performance while maintaining noise performance.

In order to further improve the advantage above, the center main grooves 4 preferably have groove widths W2 in a range of not less than 1.1 times, more preferably not less than 1.2 times, but preferably not more than 1.4 times, more preferably not more than 1.3 times, in relation to groove widths W1 of the shoulder main grooves.

The shoulder portion 5 is provided with a plurality of shoulder lateral grooves 14 that extend beyond the tread edge 2t from the shoulder main groove 3 to form a shoulder block row including a plurality of shoulder blocks 15.

Figure 4:
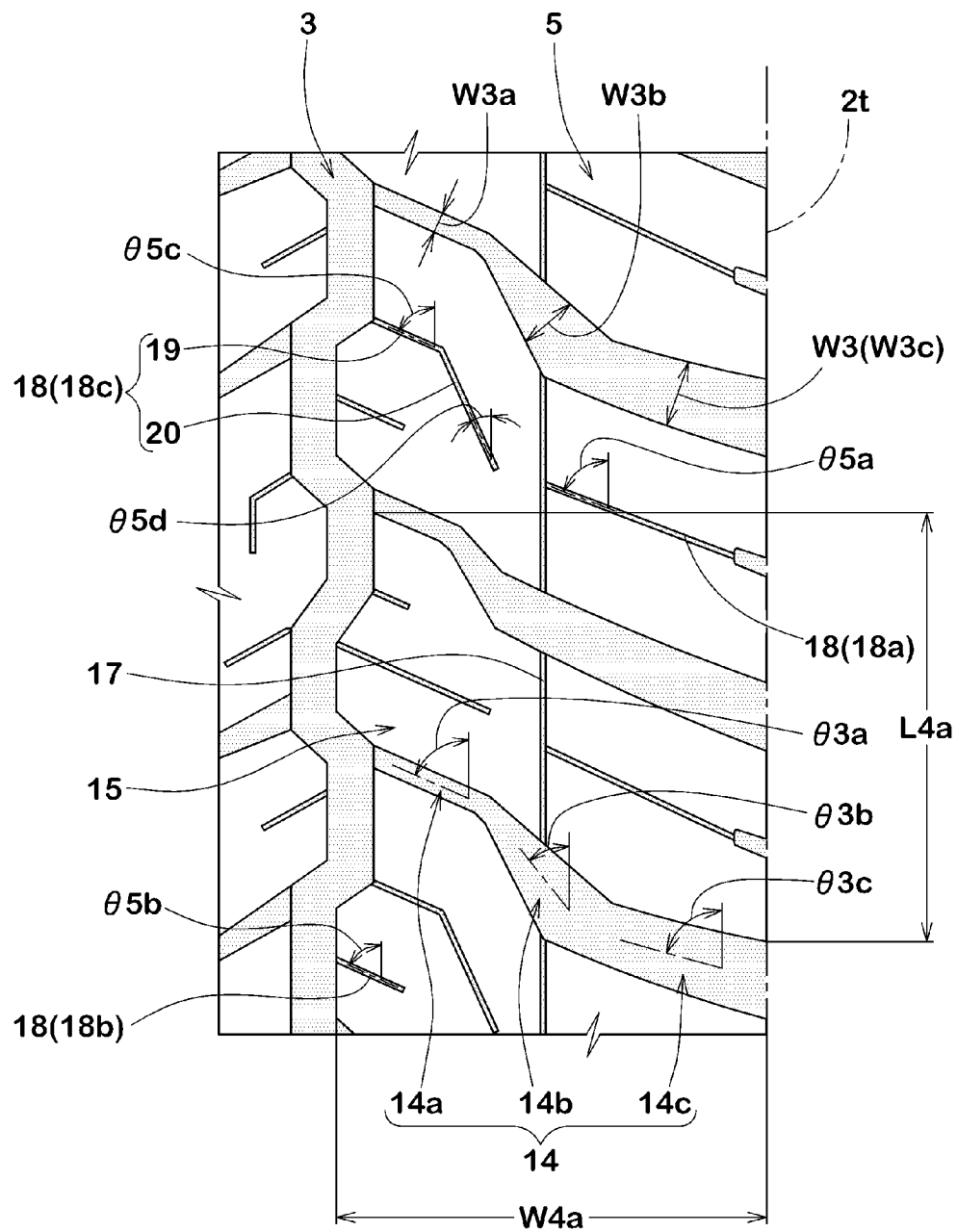
FIG. 4 is a partial enlarged view of a shoulder portion of FIG. 1.

FIG. 4 illustrates a partial enlarged view of the shoulder portion 5 in the right side of the tread portion 2 of FIG. 1. As shown in FIG. 4, each shoulder lateral groove 14 in accordance with the present embodiment includes a first inclined portion 14a extending from the shoulder main groove 3 axially outwardly of the tire having a first angle $\theta 3a$ with respect to the circumferential direction of the tire, a second portion 14c extending from the tread edge 2t axially inwardly of the tire having a second angle $\theta 3c$ with respect to the circumferential direction of the tire, and a third portion 14b connecting between the first portion 14a and the second portion 14b having a third angle $\theta 3b$ with respect to the circumferential direction of the tire. The third angle $\theta 3b$ is set smaller than the first and second angles $\theta 3a$ and $\theta 3c$ such that the shoulder lateral groove 14 extends in a zigzag manner. In this embodiment, the respective first, second and third portions 14a, 14c and 14b are inclined at the same direction such that mud therethrough is smoothly released.

Such shoulder lateral grooves 14 may grab and compress loose mud, and then shear it off for generating large mud shearing force on mud terrain. The shoulder lateral grooves 14 preferably have groove widths W3 in a range of from 3.0 to 14.0 mm, and groove depths (not shown) in a range of from 8.0 to 12.0 mm. Furthermore, the first angle $\theta 3a$ and the second angle $\theta 3c$ are preferably in a range of from 40 to 70 degrees. The third angle $\theta 3b$ is preferably in a range of from 30 to 50 degrees.

The groove width W3c of the second portion 14c is set larger than the groove width W3a of the first portion 14a. Thus, the shoulder lateral groove 14 may effectively and smoothly release mud therein toward the tread edge 2t. Preferably, the groove width W3c of the second portion 14c is set in a range of from 2.0 to 5.0 times in relation to the groove width W3a of the first portion 14a.

Preferably, the groove width W3b of the third portion 14b is gradually increasing to the second portion 14c from the first portion 14a. Thus, the third portion 14b may generate mud shearing force while smoothly releasing mud therein toward the second portion 14c such that mud terrain performance as well as drainage performance is improved.

Each shoulder block 15 is configured to have its axial length W4a larger than its circumferential length L4a in a development view of the tread portion 2. Preferably, the circumferential length L4a of the shoulder block 15 is in a range of from 19% to 24% the tread width TW (shown in FIG. 1), and the axial length W4a of the shoulder block 15 is in a range of from 20% to 25% the tread width TW.

Furthermore, the shoulder block 15 in accordance with the present invention is disposed a circumferentially extending longitudinal sipe 17, and at least one slanted sipe 18 relative to the circumferential direction of the tire.

The longitudinal sipe 17 is a full-opened sipe that communicates between the circumferentially adjacent shoulder lateral grooves 14 and 14 at an axially center region of the shoulder block 9. The longitudinal sipe 17 preferably has its depths (not shown) in a range of from 30% to 100% with respect to the groove depth (not shown) of the shoulder main groove 3. Such a longitudinal sipe 17 provides a circumferential edge component that further improves traveling performance on icy and wet roads.

In this embodiment, a plurality of slanted sipes 18 are disposed that include a first slanted sipe 18a communicating with the tread edge 2t and the longitudinal sipe 17, and a second slanted sipe 18b extending from the shoulder main groove 3 to its axially outer end without reaching the longitudinal sipe 17.

In order to further improve traveling performance on icy and wet roads, the first slanted sipe 18a and second slanted sipe 18b preferably have the respective angles $\theta 5a$ and $\theta 5b$ of from 40 to 70 degrees with respect to the circumferential direction of the tire. The first slanted sipe 18a and second slanted sipe 18b preferably have the respective depths (not shown) in the same range with the depth of the longitudinal sipe 17.

The slanted sipes 18 further include a bended sipe 18c having an axially inner slanted portion 19 and an axially outer slanted portion 20.

The axially inner slanted portion 19 extends axially outward of the tire from the shoulder main groove 3 with an angle $\theta 5c$ with respect to the circumferential direction of the tire. The axially outer slanted portion 20 extends from the axially inner slanted portion 19 to its axially outer end without reaching the longitudinal sipe 17. The axially outer slanted portion 20 is inclined at an angle $\theta 5d$ being smaller than the angle $\theta 5c$ of the axially inner slanted portion 19.

Since the bended sipe 18c includes a plurality of edge components oriented in different directions, traveling performance on icy and wet roads may further be improved. Preferably, the angle $\theta 5c$ of the axially inner slanted portion 19 is set in a range of from 40 to 70 degrees with respect to the circumferential direction of the tire. Preferably, the angle $\theta 5d$ of the axially outer slanted portion 20 is set in a range of from 10 to 30 degrees with respect to the circumferential direction of the tire.

As shown in FIG. 1, each middle portion 6 is provided with a plurality of axially inner middle lug groove 21 extending from the center main groove 4 axially outwardly of the tire, and a plurality of axially outer middle lug groove 22 extending from the shoulder main groove 3 axially inwardly of the tire.

Each middle portion 6 is further provided with a plurality of longitudinal sub grooves 23 connecting between the axially inner middle lug groove 21 and the axially outer middle lug groove 22, and between circumferentially adjacent outer middle lug grooves 22, 22. Thus, the middle portion 6 is divided into a plurality of axially inner blocks 25 defined among the center main groove 4, the axially inner middle lug grooves 21 and the longitudinal sub groove 23, and a plurality of axially outer blocks 26 defined among the shoulder main groove 4, the axially outer middle lug grooves 21 and the longitudinal sub groove 23.

Figure 5:
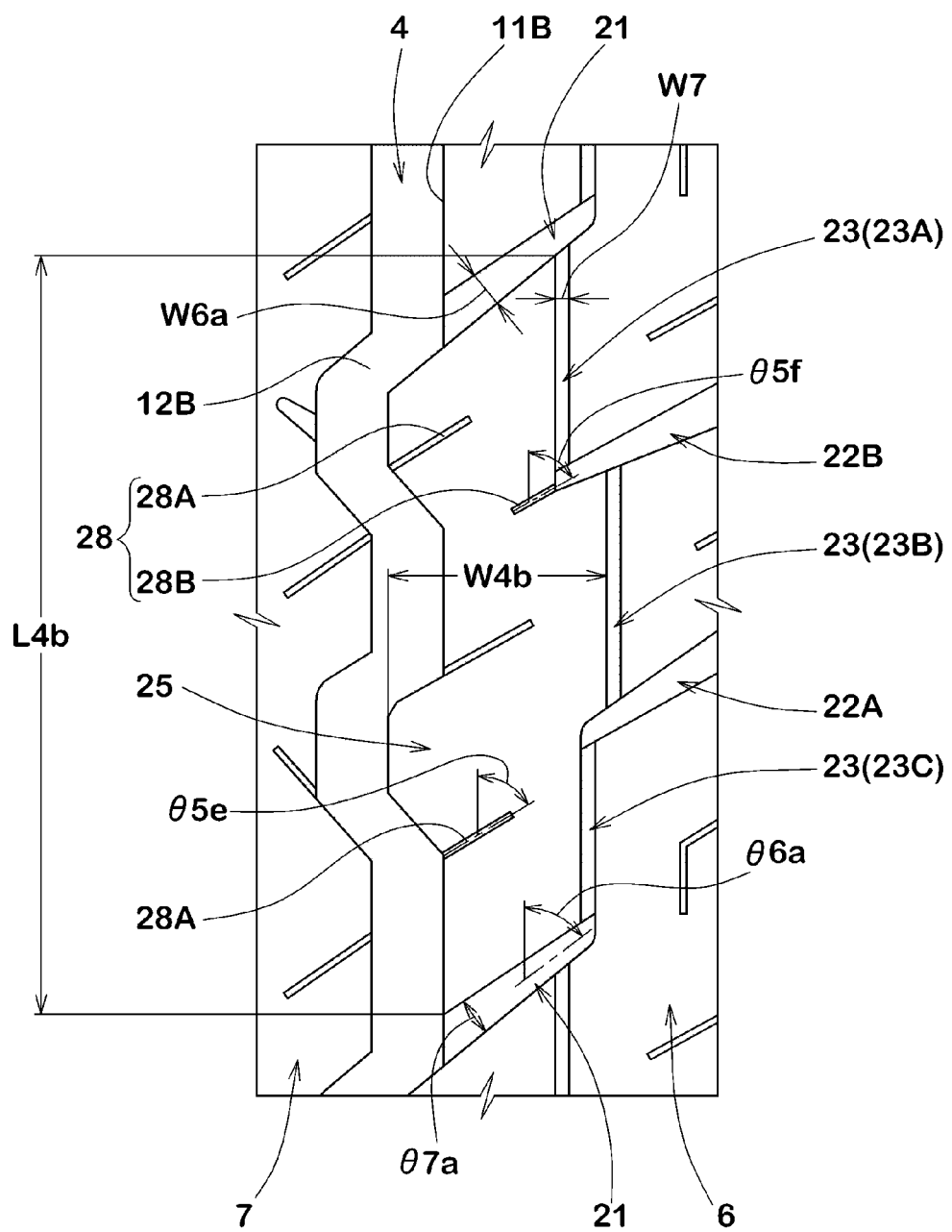
FIG. 5 is a partial enlarged view of an inner middle block of FIG. 1.

FIG. 5 illustrates a partial enlarged view of the inner middle block of FIG. 1. Referring to FIG. 5, the axially inner middle lug groove 21 is communicated with the axially outer part 11B of the center main groove 4. The axially outer end of the axially inner middle lug groove 21 terminates without reaching the shoulder main groove 3 (shown in FIG. 1). Furthermore, the axially inner middle lug groove 21 is inclined at angle $\theta 6a$ with respect to the circumferential direction of the tire so that inclined part 12B of the center main groove 4 and the axially inner middle lug groove 21 are smoothly connected one another to form one continuously inclined groove edge that extends in a straight manner. The axially inner middle lug groove 21 described above may compress loose mud therein and shear it off for generating large mud shearing force.

Preferably, the axially inner middle lug grooves 21 have groove widths $W6a$ in a range of from 4.0 to 7.0 mm, and the angles $\theta 6a$ in a range of from 40 to 60 degrees. More preferably, the axially inner middle lug grooves 21 are decreasing in the groove widths $W6a$ toward its axially outer end for smoothly releasing mud toward the center main groove 4 while shearing it off. A tapered angle $\theta 7a$ of the axially inner middle lug groove 21 between its two groove edges is preferably in a range of from 5 to 15 degrees.

Figure 6:
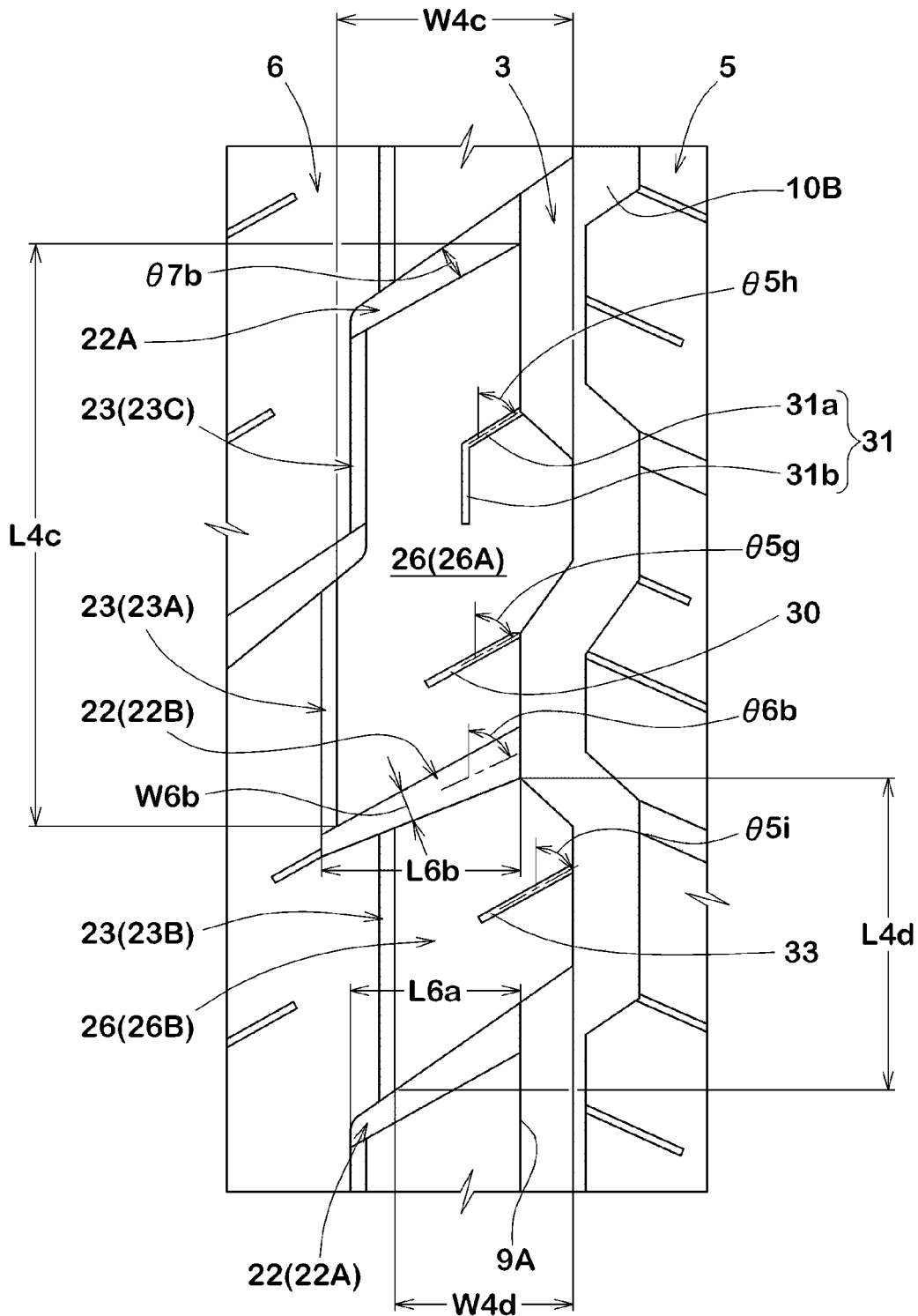
FIG. 6 is a partial enlarged view of an outer middle block of FIG. 1.

FIG. 6 illustrates a partial enlarged view of the outer middle block of FIG. 1. Referring to FIG. 6, the axially outer middle lug groove 22 is communicated with the axially inner part 9A of the shoulder main groove 3. The axially inner end of the axially outer middle lug groove 22 terminates without reaching the center main groove 4 (shown in FIG. 1). Furthermore, the axially outer middle lug groove 22 is inclined at angle $\theta 6b$ with respect to the circumferential direction of the tire. Preferably, the inclined part 10B of the shoulder main groove 3 and the axially outer middle lug groove 22 may be smoothly connected one another to form one continuously inclined groove edge that extends in a straight manner. The axially outer middle lug groove 22 described above may also compress loose mud therein and shear it off for generating large mud shearing force.

Preferably, the axially outer middle lug grooves 22 have groove widths $W6b$ in a range of from 4.0 to 7.0 mm, and the angles $\theta 6b$ in a range of from 40 to 60 degrees. More preferably, the axially outer middle lug grooves 22 are decreasing in the groove widths $W6b$ toward its axially inner end for smoothly releasing mud toward the shoulder main groove 3 while shearing it off. A tapered angle $\theta 7b$ of the axially outer middle lug groove 22 between its two groove edges is preferably in a range of from 5 to 15 degrees.

The axially outer middle lug grooves 22 in accordance with the present embodiment include a first lug groove 22A having the relatively small axial length $L6a$ and a second lug groove 22B having the relatively long axial length $L6b$, which are alternately arranged in the circumferential direction of the tire. Such axially outer middle lug grooves 22 may reduce generating large pitch noise by its frequency dispersion. Preferably, the axial length $L6a$ of the first lug groove 22A is set in a range of from 70% to 90% relative to the axial length $L6b$ of the second lug groove 22B.

Referring back to FIG. 1, regarding each middle portion 6, the total number of inner middle lug grooves 21 is smaller than the total number of outer middle lug grooves 22. Thus, since the middle portion 6 tends to have the relatively low negative ratio by the center main groove 4 that has the relatively large groove width W2, tire noise may be reduced during traveling. Furthermore, since the middle portion 6 tends to have the relatively high negative ratio by the shoulder main groove 3 that has the relatively narrow groove width W1, mud terrain performance and drainage performance may further be improved.

In order to effectively improve mud terrain performance and drainage performance while maintaining noise performance, the total number of inner middle lug grooves 21 is preferably in a range of not less than 40%, more preferably not less than 45%, but preferably not more than 65%, more preferably not more than 60%, in relation to the total number of outer middle lug grooves 22.

Furthermore, each middle portion 6 is preferably provided with two outer middle lug grooves 22 every between circumferentially adjacent inner middle lug grooves 21 for improving its rigidity in well balanced manner, whereby mud terrain performance and drainage performance may further be improved, while maintaining noise performance. Two outer middle lug grooves 22 disposed between circumferentially adjacent inner middle lug grooves 21 preferably include one first lug groove 22A and one second lug groove 22B, for effectively dispersing pitch noise in wide frequency range.

Referring to FIG. 5, the longitudinal sub grooves 23 include an axially inner longitudinal sub groove 23A, an axially outer longitudinal sub grooves 23B and an axially middle longitudinal sub groove 23C disposed therebetween. Such longitudinal sub grooves 23 help to further improve mud terrain performance and drainage performance by releasing mud and water circumferentially backwardly of the tire. Preferably, the longitudinal sub grooves 23 have groove widths W7 in a range of from 1.5 to 3.0 mm, and groove depths in a range of from 5.0 to 10.0 mm.

The axially inner longitudinal sub groove 23A communicates the axially inner end of the second lug groove 22B with the axially inner middle lug groove 21. The axially outer longitudinal sub groove 23B communicates the first lug groove 22A with the second lug groove 22B. The axially middle longitudinal sub groove 23C communicates the axially inner end of the first lug groove 22A with the axially outer end of the axially inner middle lug groove 21. These axially inner longitudinal sub groove 23A, axially outer longitudinal sub groove 23B and axially middle longitudinal sub groove 23C are circumferentially arranged in turn.

These axially inner longitudinal sub groove 23A, axially outer longitudinal sub groove 23B and axially middle longitudinal sub groove 23C help to further improve mud terrain performance and drainage performance by effectively releasing mud and water circumferentially backwardly of the tire, while dispersing pitch noise in wide frequency range.

Each axially inner middle block 25 is configured to have its circumferential length L4b larger than its axial width W4b in a development view of the tread portion 2. Thus, the axially inner middle block 25 helps to increase lateral force on mud terrain utilizing its long circumferential edge, while enhancing its rigidity in the circumferential direction of the tire to increase traction force on mud terrain. Preferably, the circumferential length L4b of the axially inner middle block 25 is in a range of from 35% to 45% the tread width TW (shown in FIG. 1), and the axial width W4b thereof is in a range of from 5% to 15% the tread width TW.

Furthermore, the axially inner middle block 25 is disposed at least one slanted sipe 28 relative to the circumferential direction of the tire. In the preferable embodiment, a plurality of slanted sipes 28 are disposed in each axially inner middle block 25. The slanted sipes 28 include a first slanted sipe 28A extending from the center main groove 4 axially outwardly of the tire without reaching the longitudinal sub grooves 23, and a second slanted sipe 28B extending from the axially inner end of the second lug groove 22B axially inwardly of the tire without reaching the center main groove 4. These slanted sipes 28A, 28B may further increase friction force against the road utilizing its biting edge for improving traveling performance on icy and wet roads.

The first slanted sipe 28A and the second slanted sipe 28B have the respective angles θ5e and θ5f in relation to the circumferential direction of the tire, which are preferably determined in the same range with the respective angles θ5a and θ5b (shown in FIG. 4) of the first slanted sipe 18a and the second slanted sipe 18b on the shoulder block 15. Furthermore, the first slanted sipe 28A and the second slanted sipe 28B have the respective depths (not shown) which are preferably determined in the same range with the depth of the longitudinal sipe 17 on the shoulder block 15.

In this embodiment, each axially inner middle block 25 is disposed three first slanted sipes 28A each of which is arranged axially inwardly of each axially inner longitudinal sub groove 23A, axially outer longitudinal sub groove 23B and axially middle longitudinal sub groove 23C, respectively. These first sipes 28A provide the axially inner middle block 25 with axially extending biting edges for improving traveling performance on icy and wet roads.

Referring to FIG. 6, the axially outer middle blocks 26 include a first axially outer middle block 26A defined among the shoulder main groove 3, second lug groove 22B, first lug groove 22A, axially inner longitudinal sub groove 23A and axially middle longitudinal sub groove 23C, and a second axially outer middle block 26B defined among the shoulder main groove 3, second lug groove 22B, first lug groove 22A, and axially outer longitudinal sub groove 23B.

The first axially outer middle block 26A is configured to have its circumferential length L4c larger than its axial width W4c in a development view of the tread portion 2. Thus, the first axially outer middle block 26A also helps to increase lateral force on mud terrain utilizing its long circumferential edge, while enhancing its rigidity in the circumferential direction of the tire to increase traction force on mud terrain. Preferably, the circumferential length L4c of the first axially outer middle block 26A is in a range of from 20% to 30% the tread width TW (shown in FIG. 1), and the axial width W4c thereof is in a range of from 7% to 12% the tread width TW.

Furthermore, the first axially outer middle block 26A is disposed at least one slanted sipe 30 in relation to the circumferential direction of the tire. The slanted sipes 30 extends from the shoulder main groove 3 axially inwardly of the tire without reaching the longitudinal sub grooves 23 The slanted sipe 30 may further increase friction force against the road utilizing its biting edge for improving traveling performance on icy and wet roads.

Furthermore, the first axially outer middle block 26A is disposed at least one bended sipe 31 that includes a slanted part 31a and a circumferential part 31b. The slanted part 31a extends from the shoulder main groove 3 axially inwardly of the tire without reaching the longitudinal sub grooves 23. The circumferential part 31b extends from the axially inner end of the slanted part 31a along the circumferential direction of the tire toward one of the axially outer middle lug grooves 22 without reaching thereto. The bended sipe 31 may further increase friction force against the road utilizing its biting edge for improving traveling performance on icy and wet roads.

The slanted sipe 30 and the slanted part 31a of the bended sipe 31 have the respective angles θ5g and θ5h in relation to the circumferential direction of the tire, which are preferably determined in the same range with the respective angles θ5a and θ5b (shown in FIG. 4) of the first slanted sipe 18a and the second slanted sipe 18b on the shoulder block 15. Furthermore, the slanted sipe 30 and the bended sipe 31B have the respective depths (not shown) which are preferably determined in the same range with the depth of the longitudinal sipe 17 on the shoulder block 15.

The second axially outer middle block 26B is configured to have its circumferential length L4d larger than its axial width W4d in a development view of the tread portion 2. Thus, the second axially outer middle block 26B also helps to increase lateral force on mud terrain utilizing its long circumferential edge, while enhancing its rigidity in the circumferential direction of the tire to increase traction force on mud terrain. Preferably, the circumferential length L4d of the second axially outer middle block 26B is in a range of from 10% to 20% the tread width TW (shown in FIG. 1), and the axial width W4d thereof is in a range of from 5% to 10% the tread width TW.

Furthermore, the second axially outer middle block 26B is disposed at least one slanted sipe 33 in relation to the circumferential direction of the tire. The slanted sipes 33 extends from the shoulder main groove 3 axially inwardly of the tire without reaching the longitudinal sub grooves 23 The slanted sipe 33 may further increase friction force against the road utilizing its biting edge for improving traveling performance on icy and wet roads. The slanted sipe 33 has its angle θ5i in relation to the circumferential direction of the tire, which is preferably determined in the same range with the respective angles θ5a and θ5b (shown in FIG. 4) of the first slanted sipe 18a and the second slanted sipe 18b on the shoulder block 15. Furthermore, the slanted sipe 33 has its depth (not shown) preferably determined in the same range with the depth of the longitudinal sipe 17 (shown in FIG. 4) on the shoulder block 15.

Figure 7:
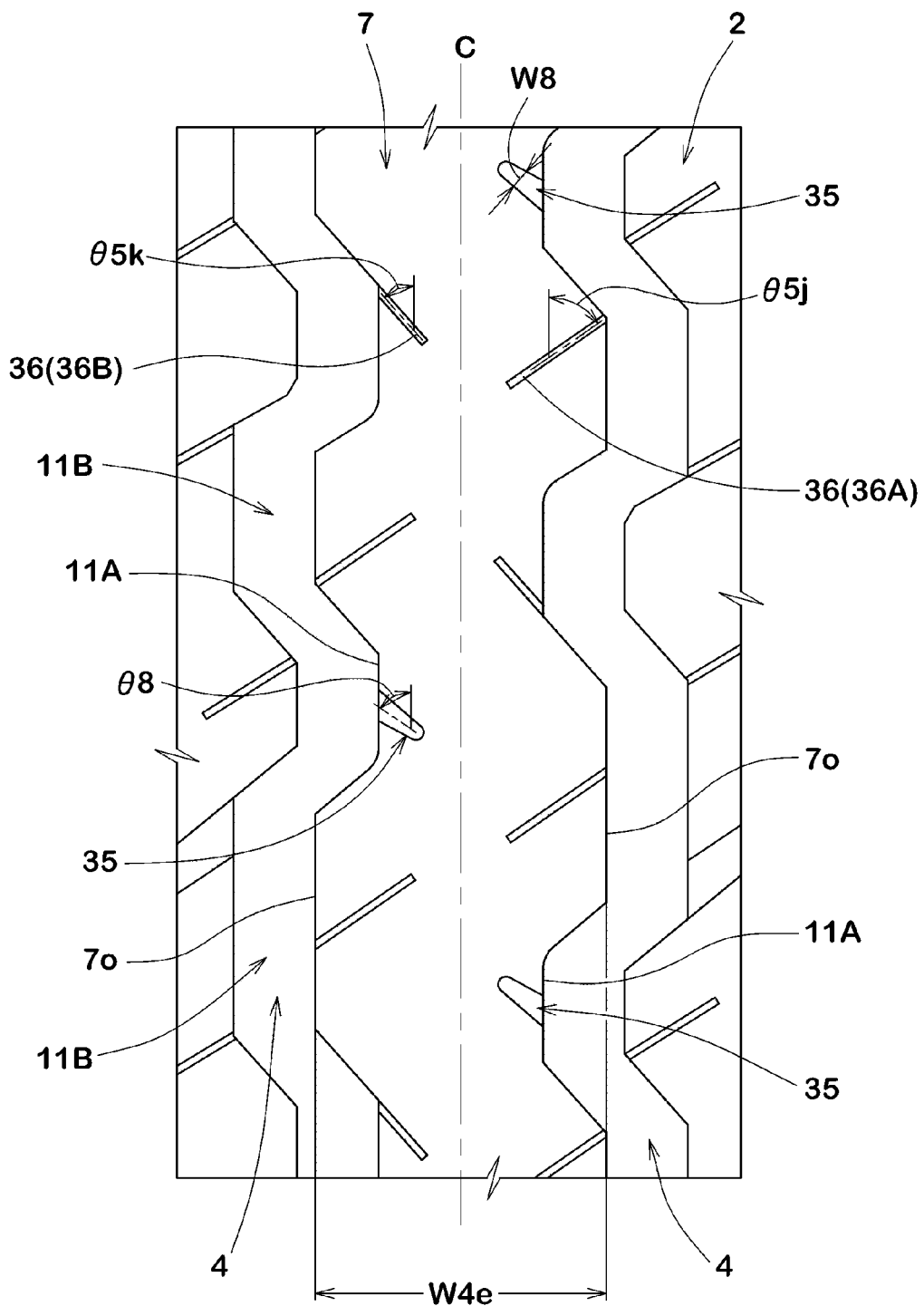
FIG. 7 is a partial enlarged view of a center portion of FIG. 1.

FIG. 7 illustrates a partial enlarged view of the center portion 7 of FIG. 1. Referring to FIG. 7, the center portion 7 is configured to a rib that continuously extends in the circumferential direction of the tire without being disposed any lateral grooves across whole width of the center portion 7. Since the center portion 7 formed as a rib tends to have high rigidity in the circumferential direction of the tire, high traction force may be generated during straight traveling ahead. The center portion 7 preferably has its maximum width W4e in a range of from 8% to 15% the tread width TW (shown in FIG. 1).

The center portion 7 is disposed a plurality of slots 35 that extend from the axially inner part 11A of the center main groove 4 toward the tire equator C without reaching thereto. Each slot 35 is inclined at angle θ8 in relation to the circumferential direction of the tire. Such slots 35 may provide mud shearing for improving mud terrain performance of the tire. Furthermore, since the slots 35 have small groove volume, it may prevent from generating large noise therefrom during traveling.

Preferably, one slot 35 is disposed every between two adjacent axially outer parts 11B of the center main groove 4, for maintaining preferred noise performance.

Preferably, the slots 35 have maximum groove widths W8 in a range of from 1% to 5% the tread width TW (shown in FIG. 1), groove depths (not shown) in a range of from 5.0 to 10.0 mm, and the angles θ8 in a range of from 40 to 60 degrees.

The center portion 7 is further disposed a plurality of slanted sipes 36 extending from the center main grooves 4 toward the tire equator C without reaching thereto.

The slanted sipes 36 include a first slanted sipe 36a having a first inclination direction in relation to the circumferential direction of the tire, and a second slanted sipe 36b having a second inclination direction opposite to the first inclination direction. Each of the first and second slanted sipes 36a and 36b are disposed in each axially outer edge 7o of the center portion 7. The slanted sipes 36 help to improve icy and wet road performance due to its biting sipe edges.

The first and second slanted sipes 36a and 36b have angles θ5j and θ5k in relation to the circumferential direction of the tire, which are preferably determined in the same range with the respective angles θ5a and θ5b (shown in FIG. 4) of the first slanted sipe 18a and the second slanted sipe 18b on the shoulder block 15. Furthermore, first and second slanted sipes 36a and 36b have the respective depths (not shown) which are preferably determined in the same range with the depth of the longitudinal sipe 17 on the shoulder block 15.

The present invention is more specifically described and explained by means of the following Examples and References. It is to be understood that the present invention is not limited to these Examples and embodiments described above.

Comparison Test

In order to confirm the advantage of the present invention, pneumatic tires having with basic tread patterns of FIG. 1 except for details shown in Table 1 were made and tested. Major common specifics of tires and test method are as follows.

Details of Test Tires:
Tire size: 285/60R18
Rim: 18×7.5J
Internal pressure: 230 kPa Mud Terrain Performance Test:

A four-wheel drive car with a displacement of 4,700 cc having test tires as its four wheels was parked on mud terrain test course with an about 20 cm thickness of loose mud. Then, a test driver suddenly started the car above by connecting its clutch at the timing of 3,000 rpm engine speed, and evaluated its initial acceleration degrees and traction performance by his feeling. The results are indicated in Table 1 by a score based on Ref. 1 being 100. The larger the score, the better the performance is.

Noise Performance Test:

According to the protocol specified in JISO-C606, the test car described above was coasted at a speed of 50 km/h in a straight test course and the noise sound level dB(A) was measured with a microphone set at 7.5 meter sideways from the test car. The results in Table 1 are indicated as the reciprocal number of measured value using an index based on Ref. 1 being 100. The larger the score, the better the performance is.

Test results are shown in Table 1. From the test results, it was confirmed that Example tires in accordance with the present embodiment of the invention can be effectively improved mud terrain performance while maintaining noise performance.

TABLE 1

| | Ref. 1 | Ref. 2 | Ref. 3 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|
| Shoulder and center main groove configurations (*1) | B | A | A | A | A | A | A | A | A | A | A | A |
| Shoulder main groove width W1 (mm) | 6 | 6 | 6 | 6 | 6 | 6 | 6 | 6 | 6 | 6 | 6 | 6 |
| Center main groove width W2 (mm) | 6 | 6 | 8 | 8 | 6.6 | 8.4 | 8 | 8 | 8 | 8 | 8 | 8 |
| Ratio W2/W1 | 1 | 1 | 1.3 | 1.3 | 1.1 | 1.4 | 1.3 | 1.3 | 1.3 | 1.3 | 1.3 | 1.3 |
| Total number of inner middle lug grooves/total number of outer middle lug grooves (%) | 100 | 100 | 100 | 50 | 50 | 50 | 40 | 60 | 50 | 50 | 50 | 50 |
| First axial gap L1a of shoulder main groove (mm) | 5 | 5 | 5 | 5 | 5 | 5 | 5 | 5 | 4.5 | 3.6 | 4.5 | 5 |
| Second axial gap L1b of shoulder main groove (mm) | 5 | 5 | 5 | 5 | 5 | 5 | 5 | 5 | 6 | 6 | 5 | 5 |
| Ratio L1a/L1b (%) | 100 | 100 | 100 | 100 | 100 | 100 | 100 | 100 | 75 | 60 | 90 | 100 |
| First axial gap L2a of center main groove (mm) | 5.5 | 5.5 | 5.5 | 5.5 | 5.5 | 5.5 | 5.5 | 5.5 | 4.8 | 4.2 | 5.4 | 5.5 |
| Second axial gap L2b of center main groove (mm) | 5.5 | 5.5 | 5.5 | 5.5 | 5.5 | 5.5 | 5.5 | 5.5 | 6.4 | 7 | 6 | 5.5 |
| Ratio L2a/L2b (%) | 100 | 100 | 100 | 100 | 100 | 100 | 100 | 100 | 75 | 60 | 90 | 100 |
| Tapered shape of inner middle lug grooves | Absence | Presence | Presence | Presence | Presence | Presence | Presence | Presence | Presence | Presence | Presence | Absence |
| Tapered shape of outer middle lug grooves | Absence | Presence | Presence | Presence | Presence | Presence | Presence | Presence | Presence | Presence | Presence | Absence |
| Mud terrain performance (Score) | 100 | 110 | 125 | 120 | 115 | 125 | 115 | 125 | 120 | 110 | 125 | 115 |
| Noise performance (Index) | 100 | 100 | 90 | 100 | 105 | 95 | 105 | 95 | 105 | 110 | 100 | 100 |

(*1)
A: Zigzag grooves shown in FIG. 1
B: Straight grooves

What is claimed is:

1. A pneumatic tire comprising a tread portion having a pair of tread edges, the tread portion being provided with a pair of circumferentially and continuously extending shoulder main grooves adjacent to each tread edge and a pair of circumferentially and continuously extending center main grooves disposed axially inwardly of the shoulder main grooves to define a pair of middle portions each of which is between the adjacent shoulder main groove and center main groove, the shoulder main grooves having groove widths, the center main grooves having groove widths larger than the groove widths of the shoulder main grooves, and the respective middle portions being provided with a plurality of inner middle lug grooves extending axially outwardly of the tire from the center main groove, and a plurality of outer middle lug grooves extending axially inwardly of the tire from the shoulder main groove, the total number of inner middle lug grooves being smaller than the total number of outer middle lug grooves, in each middle portion, wherein each of the shoulder main grooves and the center main grooves comprises a plurality of axially inner parts and a plurality of axially outer parts disposed axially inwardly of the axially outer parts, wherein the axially outer parts and the axially inner parts are alternately arranged in a circumferential direction of the tire, wherein each of the shoulder main grooves and center main grooves has an axially inner groove edge and an axially outer groove edge, and wherein a first axial gap between the axially inner part and the axially outer part on the axially inner groove edge is smaller than a second axial gap between the axially inner part and the axially outer part on the axially outer groove edge.

2. The tire according to claim 1, wherein the total number of inner middle lug grooves is in a range of from 40% to 60% in relation to the total number of outer middle lug grooves in each middle portion.

3. The tire according to claim 1, wherein each middle portion is provided with two outer middle lug grooves every between adjacent inner middle lug grooves.

4. The tire according to claim 1, wherein groove widths of the inner middle lug grooves are gradually decreasing axially outwardly of the tire from the center main groove, and groove widths of the outer middle lug grooves are gradually decreasing axially inwardly of the tire from the shoulder main groove.

5. The tire according to claim 1, wherein the first axial gap is in a range of from 60% to 90% in relation to the second axial gap.

6. The tire according to claim 1, wherein each middle portion is provided with a circumferentially extending longitudinal sub groove that communicates between the adjacent outer middle lug groove and inner middle lug groove, or between the adjacent outer middle lug grooves.

* * * * *